(12) United States Patent
Cho

(10) Patent No.: US 7,022,355 B2
(45) Date of Patent: Apr. 4, 2006

(54) COMPOSITION AND PROCESS FOR THE PRODUCTION OF A VEGETABLE PROTEIN COMPOSITION CONTAINING AN ALKALINE EARTH METAL SALT

(75) Inventor: Myong J. Cho, Chesterfield, MO (US)

(73) Assignee: Solae, LLC, St. Louis, MO (US)

( * ) Notice: Subject to any disclaimer, the term of this patent is extended or adjusted under 35 U.S.C. 154(b) by 359 days.

(21) Appl. No.: 10/431,806

(22) Filed: May 8, 2003

(65) Prior Publication Data

US 2004/0224074 A1    Nov. 11, 2004

(51) Int. Cl.
*A23L 1/201* (2006.01)
*A23L 1/304* (2006.01)

(52) U.S. Cl. .................. 426/74; 426/519; 426/590; 426/634

(58) Field of Classification Search .............. 426/74, 426/519, 590, 634
See application file for complete search history.

(56) References Cited

U.S. PATENT DOCUMENTS

| | | | |
|---|---|---|---|
| 2,605,229 A | 7/1952 | Maracus | 252/317 |
| 2,967,802 A | 1/1961 | Towey et al. | 167/78 |
| 3,027,229 A | 3/1962 | Towey et al. | 23/109 |
| 3,066,073 A | 11/1962 | Ratcliff et al. | 167/55 |
| 3,375,168 A | 3/1968 | Curtin et al. | 167/93 |
| 3,428,624 A | 2/1969 | Toy et al. | 260/234 |
| 3,852,497 A | 12/1974 | Skelcey et al. | 426/74 |
| 3,897,575 A | 7/1975 | White | 426/511 |
| 3,901,976 A | 8/1975 | Roth et al. | 426/69 |
| 3,931,416 A | 1/1976 | Grams et al. | 426/648 |
| 4,214,996 A | 7/1980 | Buddemeyer et al. | 252/1 |
| 4,216,236 A | 8/1980 | Mueller et al. | 426/72 |
| 4,351,735 A | 9/1982 | Buddemeyer et al. | 252/1 |
| 4,642,238 A | 2/1987 | Lin et al. | 426/74 |
| 4,906,482 A | 3/1990 | Zemel et al. | 426/74 |
| 5,766,330 A | 6/1998 | Knights et al. | 106/124.2 |
| 6,482,448 B1 | 11/2002 | Tabor | 424/757 |

*Primary Examiner*—Helen Pratt
(74) *Attorney, Agent, or Firm*—James L. Cordek; Holly M. Amjad; Cary A. Levitt

(57) ABSTRACT

This invention is directed to an alkaline earth metal fortified vegetable protein composition dispersed in an aqueous medium, comprising an aqueous slurry of a vegetable protein material and a hydrated gel of an alkaline earth metal phosphate salt. The alkaline earth metal content of the alkaline earth metal fortified vegetable protein composition is from about 3–12% by weight, on a dry basis and further, the alkaline earth metal fortified vegetable protein composition forms a stable suspension in said aqueous medium. The invention is also directed to a process for producing a mineral enriched protein composition for use in the production of foodstuffs. This process is carried forth by combining an aqueous slurry of a vegetable protein material and a hydrated gel of an alkaline earth metal phosphate salt. The hydrated gel of an alkaline earth metal phosphate salt is prepared by forming an aqueous slurry of an alkaline earth metal hydroxide wherein the alkaline earth metal hydroxide forms at least 2% by weight of the slurry, rapidly adding phosphoric acid to the slurry of the alkaline earth metal hydroxide; and vigorously mixing and homogenizing the slurry of the alkaline earth metal hydroxide and the phosphoric acid to form the gel, wherein the gel has a solids content of at least 3.0% by weight and the gel is capable of forming a stable aqueous suspension in water.

23 Claims, No Drawings

COMPOSITION AND PROCESS FOR THE PRODUCTION OF A VEGETABLE PROTEIN COMPOSITION CONTAINING AN ALKALINE EARTH METAL SALT

FIELD OF THE INVENTION

This invention relates to a composition of matter and a process for producing the composition of matter. The composition and its process thereof relate to a vegetable protein material that contains an alkaline earth metal salt.

BACKGROUND OF THE INVENTION

Protein materials derived from vegetable protein sources such as soybeans are utilized for nutritional purposes in a variety of foods and beverages. Vegetable protein isolates, having a protein content of at least 70%, are particularly useful nutritional supplements in foods and beverages.

The usefulness of such nutritional vegetable protein materials in beverages depends in part of the dispersability or suspendibility of the protein material in the particular type of aqueous medium used in the preparation of the beverage. While such protein materials are generally dipsersible in aqueous media, it has been more difficult to employ these protein materials in conjunction with certain vitamins and minerals that may be required to form a nutritionally complete beverage, such as an infant formula. Fortification of a liquid product with an alkaline earth metal material, particularly calcium, presents a problem since most forms of such materials employed for nutritional supplementation in beverages are relatively insoluble in aqueous media. These materials readily precipitate or settle from an aqueous suspension of a nutritious beverage, particularly when present at relatively high concentrations, thereby giving the beverage a gritty mouthfeel and requiring the consumer of the beverage to shake the beverage relatively often to ensure adequate consumption of the minerals in the beverage.

An effective method for formulating alkaline earth metal mineral fortified protein compositions for use in aqueous media beverages is provided in U.S. Pat. No. 4,642,238. According to this method, a hydrated gel of an alkaline earth metal salt is formed, the gel is added to an aqueous slurry of an isolated vegetable protein material, and the combined gel and protein material are dewatered to provide the alkaline earth mineral fortified protein composition. The alkaline earth metal mineral fortified protein composition provides improved suspension of the mineral in an aqueous medium beverage.

The method of the U.S. Pat. No. 4,642,238 patent allows moderate levels of an alkaline earth metal salt to be incorporated into a vegetable protein composition, but is ineffective or commercially inefficient when relatively high levels of mineral fortification of the protein composition are desired. Formation of a hydrated gel of an alkaline earth metal phosphate salt by the reaction

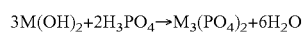

$$3M(OH)_2 + 2H_3PO_4 \rightarrow M_3(PO_4)_2 + 6H_2O$$

where M is an alkaline earth metal is the most preferable method for forming the hydrated gel since no salt by-product is formed which must be removed from the gel before combining the gel with a protein material. Insoluble alkaline earth metal hydroxide materials do not form a hydrated gel with phosphoric acid when the phosphoric acid is slowly added to a solution of the alkaline earth metal hydroxide, as disclosed in the '238 patent.

The degree to which a protein material can be fortified with a mineral from a hydrated alkaline earth metal phosphate gel is limited by the maximum concentration of the alkaline earth metal in the gel. Unlimited amounts of the gel cannot be added to a slurry of the protein material to obtain a desired level of mineral fortification since the drying process of the combined gel and protein material is adversely affected by a low solids level. Spray drying the combined protein/gel combination is the only effective method of drying to obtain a dried product which has excellent dispersability in an aqueous medium since other drying methods do not uniformly mix the mineral fortifying salt and the protein material. Slurries having less than about 5% solids cannot be effectively spray dried due to the fine particle size produced by spray drying a low-solids slurry, and the resulting loss of product. Prior to the present invention, a hydrated gel formed from an alkaline earth metal hydroxide and phosphoric acid could contain a maximum solids level of about 4.5%. A vegetable protein material slurry could contain about 20% solids. The hydrated gel of 4.5% solids and the vegetable protein slurry of 20% solids are combined together at a ratio to produce a hydrated gel—vegetable protein slurry mixture having a solids content of about 14%. This mixture is spray dried to give a mineral fortified vegetable protein having an alkaline earth metal content of about 3% by weight.

SUMMARY OF THE INVENTION

This invention is directed to an alkaline earth metal fortified vegetable protein composition dispersed in an aqueous medium, comprising an aqueous slurry of a vegetable protein material and a hydrated gel of an alkaline earth metal phosphate salt. The alkaline earth metal content of the alkaline earth metal fortified vegetable protein composition is from about 3–12% by weight, on a dry basis and further, the alkaline earth metal fortified vegetable protein composition forms a stable suspension in said aqueous medium. The invention is also directed to a process for producing a mineral enriched protein composition for use in the production of foodstuffs. This process is carried forth by combining an aqueous slurry of a vegetable protein material and a hydrated gel of an alkaline earth metal phosphate salt. The hydrated gel of the alkaline earth metal phosphate salt is prepared by forming an aqueous slurry of an alkaline earth metal hydroxide wherein the alkaline earth metal hydroxide forms at least 2% by weight of the slurry, rapidly adding phosphoric acid to the slurry of the alkaline earth metal hydroxide; and vigorously mixing and homogenizing the slurry of the alkaline earth metal hydroxide and the phosphoric acid to form the gel, wherein the gel has a solids content of at least 3.0% by weight and the gel is capable of forming a stable aqueous suspension in water.

DETAILED DESCRIPTION OF THE INVENTION

The instant invention comprises a composition and a process for the production of a mineral enriched protein composition, which has improved suspension characteristics in liquid foodstuffs and overcomes problems associated with the suspension of mineral fortifying materials in dietary beverages or nutritionally balanced, liquid drink products.

In a brief outline, and for a complete understanding thereof, the vegetable protein material comprises a soy protein material which forms a component of the composition and process of the present invention.

Soybean protein materials which are useful with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 40% to about 60%, with the remaining material in the flour being inert material in a protein adhesive paper coating. Preferably the flour is very finely ground, most preferably so that less than about 1% of the flour is retained on a 300 mesh (U.S. Standard) screen.

Soy concentrate, as the term is used herein, refers to a soy protein material containing about 60% to about 80% of soy protein. Soy concentrate is preferably formed from a commercially available defatted soy flake material from which the oil has been removed by solvent extraction. The soy concentrate is produced by washing the soy flake material with an aqueous solvent having a pH at about the isoelectric point of soy protein, preferably at a pH of about 4 to about 5, and most preferably at a pH of about 4.4 to about 4.6. The isoelectric wash removes a large amount of water soluble carbohydrates and other water soluble components from the flakes, but removes little of the protein, thereby forming a soy concentrate. The soy concentrate is dried after the isoelectric wash.

Soy protein isolate, as the term is used herein, refers to a soy protein material containing about 80% or greater protein content, preferably about 90% or greater protein content, and most preferably about 95% or greater protein content. Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted, soy protein material or soybean flakes are then placed in an aqueous bath to provide a mixture having a pH of at least about 6.5 and preferably between about 7.0 and 10 in order to extract the protein. Typically, if it is desired to elevate the pH above 6.5 various alkaline reagents such as sodium hydroxide, potassium hydroxide and calcium hydroxide or other commonly accepted food grade alkaline reagents may be employed to elevate the pH. A pH of above about 7 is generally preferred, since an alkaline extraction facilitates solubilization of the protein. Typically, the pH of the aqueous extract of protein, will be at least about 6.5 and preferably about 7.0 to 10. The ratio by weight of the aqueous extractant to the vegetable protein material is usually between about 20 to 1 and preferably a ratio of about 10 to 1. In an alternative embodiment, the vegetable protein is extracted from the milled, defatted flakes with water, that is, without a pH adjustment.

It is also desirable in obtaining the soy protein isolate used in the present invention, that an elevated temperature be employed during the aqueous extraction step, either with or without a pH adjustment, to facilitate solubilization of the protein, although ambient temperatures are equally satisfactory if desired. The extraction temperatures which may be employed, can range from ambient up to about 120° F. with a preferred temperature of 90° F. The period of extraction is further non-limiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, without the pH adjustment or having a pH of at least 6.5, or preferably about 7.0 to 10, are then precipitated by adjustment of the pH of the extracts to, at or near the isoelectric point of the protein to form an insoluble curd precipitate. The actual pH to which the protein extracts are adjusted will vary depending upon the vegetable protein material employed but insofar as soy protein, this typically is between about 4.0 and 5.0. The precipitation step may be conveniently carried out, by the addition of a common food grade acidic reagent such as acetic acid, sulfuric acid, phosphoric acid, hydrochloric acid or with any other suitable acidic reagent. Following precipitation of the protein, the solids level of the precipitated slurry is increased, such as by centrifugation or similar means for purposes of concentrating the protein and removing, insofar as possible, the whey or supernatant. The precipitated protein, in aqueous suspension, can then be employed in the production of the mineral enriched protein composition as hereinafter described.

The soy protein curd is then formed into an aqueous slurry for purposes of mineral enrichment as described below. Although the protein isolate can be obtained directly from the isolation procedure as described above, in which the precipitated protein is still in the form of an aqueous suspension, it is equally possible insofar as the present invention to employ as a starting material a dried protein isolate which is dispersed into an aqueous medium to form an aqueous suspension.

Preferably the protein material used in the present invention, is modified to enhance the characteristics of the protein material. The modifications are modifications which are known in the art to improve the utility or characteristics of a protein material and include, but are not limited to, denaturation and hydrolysis of the protein material.

The protein material may be denatured and hydrolyzed to lower the viscosity. Chemical denaturation and hydrolysis of protein materials is well known in the art and typically consists of treating a protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material are: a pH of about 11 to about 13; a temperature of about 50° C. to about 80° C. and a time period of about 15 minutes to about 3 hours, where the denaturation and hydrolysis of the protein material occurs more rapidly at higher pH and temperature conditions.

Hydrolysis of the protein material may also be effected by treating the protein material with an enzyme capable of hydrolyzing the protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of protein material, typically from about 0.1% to about 10% enzyme by weight of the protein material, and treating the enzyme and protein dispersion at a temperature, typically from about 5° C. to about 75° C., and a pH, typically from about 3 to about 9, at which the enzyme is active for a period of time sufficient to hydrolyze the protein material. After sufficient hydrolysis has occurred the enzyme is deactivated by heating, and the protein material is precipitated from the solution by adjusting the pH of the solution to about the isoelectric point of the protein material.

An essential aspect of the present invention, however, is the particular means for mineral fortification of the protein material. It has been found, for example, that if mineral fortification of the protein material takes place by the addition of a hydrated gel of the mineral fortifying material as compared to the addition of a dried, mineral supplement, a product of improved suspension characteristics is achieved. The improved suspension characteristics are also retained after drying of the fortified protein composition.

A hydrated gel of an alkaline earth metal salt is prepared for purposes of providing a means for mineral enrichment of the protein material, wherein a mineral fortified protein composition is formed that has improved suspension characteristics when used in the production of a liquid foodstuff such as a nutritional beverage. Typical alkaline earth materials used for mineral fortification and which are considered to be essential for nutritional purposes include calcium and magnesium. Calcium has proven to be a particular problem insofar as fortification of protein supplements for liquid foodstuffs, since it is used at a higher fortification level than other minerals, in an aqueous medium such as an infant formula or nutritional beverage. For the most part, this has been accomplished in the prior art by the dispersal of a dried calcium phosphate salt in the dried protein supplement, which upon dispersion in an aqueous medium, still often results in settling of the mineral components during storage of the liquid foodstuff.

While the present invention is particularly directed toward the production of calcium fortified, protein compositions of improved suspension characteristics, it is equally adaptable to other bivalent salts such as the alkaline earth metals salts normally used for mineral fortification of foodstuffs such as magnesium. The exact means of forming the hydrated gel of the magnesium or calcium alkaline earth metal salts is critical to the practice of the present invention. The hydrated gel is formed by reacting phosphoric acid with either magnesium hydroxide or calcium hydroxide in the presence of, or followed by either ultrasonication or homogenization.

An aqueous slurry of calcium hydroxide or magnesium hydroxide is prepared by adding calcium hydroxide or magnesium hydroxide, respectively to water. Alternatively, the alkaline earth metal hydroxide can be prepared in situ by reacting calcium oxide, calcium carbide or magnesium oxide with water. The alkaline earth metal hydroxides have limited solubility in water. However, it is not necessary for the alkaline earth metal hydroxides to be in solution in order to react with the phosphoric acid to form a hydrated gel. An aqueous slurry of alkaline earth metal hydroxide will suffice. The alkaline earth metal hydroxide slurry, either prepared from an alkaline earth metal hydroxide or prepared in situ, contains from 2 up to 10%, preferably up to 8% and most preferably up to 7% by weight alkaline earth metal hydroxide.

A stoichiometric amount of phosphoric acid at from 10 to 85% is quickly added to the alkaline earth metal hydroxide slurry at from 30 seconds to 5 minutes, depending upon the batch size, while employing, or followed by ultrasonication or homogenization. There is no need to keep the pH of the reaction on the basic side. The ultrasonication and homogenization serve to reduce the particle size of the alkaline earth metal hydroxide and provide mechanical energy such that all the alkaline earth metal hydroxide reacts with the phosphoric acid. The ultrasonication and homogenization also serve to reduce the particle size of the hydrated gel of the formed alkaline earth metal phosphate salt.

The reaction of phosphoric acid with the alkaline earth metal hydroxide produces an alkaline earth metal phosphate salt, especially a tri-alkaline earth metal phosphate salt and preferred is tricalcium phosphate.

The homogenization can be carried out using a conventional homogenizer. Preferably the homogenization is effected using an APV Gaulin homogenizer at from 500–2000 pounds per square inch. Ultrasonication can be carried out using a Model A, ultrasonic mixing device sold under the trade name Sonolator by the Sonics Corporation. For ultrasonication, the pressure is from 1000–1500 pounds per square inch. The hydrated gel, especially as tricalcium phosphate is insoluble in an aqueous medium. The amount of the hydrated gel present as solids after the reaction of the alkaline earth metal hydroxide and phosphoric acid is generally from about 3.0% up to about 14.0%, preferably up to about 11% and most preferably up to about 10% by weight.

Mineral enrichment or fortification of the soy protein material with the hydrated gel is accomplished by adding the hydrated gel to the soy protein material. The ratio of hydrated gel to soy protein material is dependent upon the alkaline earth metal content desired, on a dry basis.

The following examples represent specific but non-limiting embodiments of the present invention.

EXAMPLE 1

A soy protein isolate is prepared in which 150 pounds per hour of defatted soybean flakes are fed to an extraction tank to which is added 1500 pounds per hour of water which is heated to 90° F. Sufficient calcium hydroxide is added to adjust the pH of the mixture to 9.7. The soy flakes are extracted for a period of 30 minutes after which the aqueous solution is separated from the extracted flakes by centrifugation. The first aqueous extract is held while the extracted flake residue is redispersed in 900 pounds per hour of water at a temperature of 90° F. The pH of the mixture at this point is 9.0.

A second aqueous extract from the flakes is obtained by centrifugation and combined with the first aqueous extract. To the combined extracts, 37% hydrochloric acid is added to adjust the pH to 4.5 and precipitate the protein. The precipitated protein is then centrifuged to remove excess liquid to a solids level of 24–28% by weight. The precipitated protein is then diluted with water to form a slurry having a solids level of 7.5% by weight. The pH of the slurry is adjusted to 6.6 by the addition of sodium hydroxide.

A mixture of 2.3% calcium hydroxide and water is prepared by adding 230 grams calcium hydroxide to 9536 grams water, with stirring. The calcium hydroxide is permitted to disperse in the water for 1 hour. An amount of 85% phosphoric acid (238 grams) is added over a 30 minute period. At the end of the acid addition, the contents are permitted to stir for an additional 30 minutes. The slurry is transferred to a Gaulin homogenizer (model 15MR) and homogenized at 1500 pounds per square inch. The resulting hydrated gel of tricalcium phosphate has a solids content of 3.21%.

The hydrated gel is added in an amount sufficient to provide a calcium level of 2.6% by weight of the protein solids on a dry basis and the fortified slurry was allowed to equilibrate for 1 hour. The calcium fortified slurry is then passed through a jet cooker at a pressure of 85 pounds per square inch. The steam heats the slurry in the jet cooker to a temperature of 310° F. After 8–10 seconds, progressive portions of the heated slurry are discharged into a receiver at below atmospheric pressure. The mineral fortified slurry is then spray dried to a moisture level of less than 5% by weight.

The following examples are directed to the preparation of hydrated gels of trialkaline earth metal phosphate salts from the reaction of calcium hydroxide and phosphoric acid.

EXAMPLE 2

The procedure of the hydrated gel of Example 1 is repeated except that 4% (400 grams) calcium hydroxide is added to 9186 grams water and reacted with 414 grams of 85% phosphoric acid. After homogenization, the hydrated gel of tricalcium phosphate has a solids content of 5.58%.

EXAMPLE 3

The procedure of the hydrated gel of Example 1 is repeated except that 5% (500 grams) calcium hydroxide is added to 8982 grams water and reacted with 518 grams of 85% phosphoric acid. After homogenization, the hydrated gel of tricalcium phosphate has a solids content of 6.64%.

EXAMPLE 4

The procedure of the hydrated gel of Example 1 is repeated except that the slurry of calcium hydroxide and phosphoric acid is subjected to sonication instead of homogenization. The hydrated gel of tricalcium phosphate has a solids content of 3.21%.

The hydrated, mineral gels from any of Examples 2–4 is then added to the protein slurry in an amount effective to provide a mineral fortified protein composition, with the exact amount to be added, to be dependent upon the degree of fortification desired. For example in the case of adults, a level of about 1.5% calcium based upon the protein solids in the mineral fortified protein composition is sufficient to meet the daily requirement, whereas, in the case of infants or in the event one wants to simulate milk by providing a comparable calcium level, the level is usually about 2.7%–3.5% or higher. Therefore the exact amount of gel added, is entirely dependent upon the degree of fortification desired, and the specific amount added is not intended to limit the present invention.

This invention is directed to the formation of a stable aqueous suspension of a mineral enriched protein composition, that is, mineral fortification of a protein composition wherein the mineral is an alkaline earth metal phosphate, especially tricalcium phosphate. The mineral (calcium and phosphorus) is the major contributor to ash content of the mineral fortified protein composition. In the mineral suspension index (MSI) outlined below, the suspended mineral is estimated from the ash content. The MSI is a means of determining the degree of suspension of a mineral fortified protein composition. The procedure for the determination of MSI as a percentage is as follows:

1. Measure 475 milliliters of deionized water at 25° C. into a blender jar.
2. Add 2–3 drops defoamer.
3. Slowly add 25.0 grams ±0.1 grams of a mineral enriched protein composition with gentle mixing to form a slurry.
4. Mix the slurry for 30–60 seconds at low speed making certain that no lumps or unwetted mineral enriched protein composition remains on the side of the blender jar. Blending may be interrupted to dislodge any lumps clinging to the sides of the jar.
5. Transfer the slurry to an 800 milliliter beaker that contains a magnetic stirrer bar. Use a spatula to maker certain that all the slurry is transferred. Cover the beaker with plastic wrap or aluminum foil and stir the slurry for 30 minutes on a magnetic stirring plate.
6. After stirring is complete, skim off and discard any foam.
7. Transfer 200 grams of slurry to each of two 250 milliliter centrifuge bottles. Save the remaining slurry for total solids and ash determinations.
8. Centrifuge the bottles with the slurry at 500 revolutions per minute for 10 minutes.
9. Using a syringe, withdraw about 100 milliliters of supernatant from the centrifuge bottle.
10. Determine total solids and ash of the slurry from Step 7 and the supernatant from step 9.

The MSI of the mineral fortified protein composition is determined per the following formula:

$$MSI = \frac{S_a - 0.2\left(\frac{S_s}{T_s}\right)}{T_a - 0.2} \times 100$$

wherein
$S_a$=ash content of supernatant
$T_a$=ash content of total slurry
$S_s$=Solids content of the supernatant
$T_s$=solids content of the total slurry
0.2=Ash correction factor for the soy protein material in the mineral fortified protein composition.

Slurry samples of the mineral fortified protein composition of this invention are prepared and the MSI procedure is conducted on slurry samples that are 1, 4 and 8 weeks old. As a comparison, dry tricalcium phosphate is added to a dry protein and thoroughly mixed. Water is added to form a comparative phosphate slurry. The comparative phosphate slurry (Baseline) is compared to the inventive slurry at equal levels of tricalcium phosphate in Table I.

TABLE I

| | MSI Data | | |
|---|---|---|---|
| Example | One Week | Four Weeks | Eight Weeks |
| Baseline | 69.1 | 63.7 | 14.2 |
| Slurry Sample of Example 1 | 89.1 | 87.8 | 72.3 |

It is observed from the data of Table I that the MSI of the instant invention is much improved over the MSI of the Baseline.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. An alkaline earth metal fortified vegetable protein composition dispersed in an aqueous medium, comprising; an aqueous slurry of a vegetable protein material and a hydrated gel of an alkaline earth metal phosphate salt wherein the hydrated gel of the alkaline earth metal phosphate salt is present as solids at from about 3.0% up to about 14%, wherein the hydrated gel is subjected to either homogenization or sonication, and wherein the hydrated gel of the alkaline earth metal phosphate salt is capable of forming a stable aqueous suspension in water, wherein the alkaline earth metal content of the alkaline earth metal fortified vegetable protein composition is from about 3–12% by weight, on a dry basis and wherein the alkaline earth metal fortified vegetable protein composition forms a stable suspension in said aqueous medium.

2. The composition of claim 1 wherein the vegetable protein material is a soybean protein material.

3. The composition of claim 2 wherein the soybean protein material comprises soy flour, soy concentrate or soy protein isolate.

4. The composition of claim 2 wherein the soybean protein material comprises soy protein isolate.

5. The composition of claim 1 wherein the alkaline earth metal comprises magnesium or calcium.

6. The composition of claim 1 wherein the alkaline earth metal is calcium.

7. The composition of claim 1 wherein the alkaline earth metal phosphate salt is tricalcium phosphate.

8. The composition of claim 1 wherein the alkaline earth metal content of the alkaline earth metal fortified vegetable protein composition is up to about 10% by weight.

9. The composition of claim 1 wherein the alkaline earth metal content of the alkaline earth metal fortified vegetable protein composition is up to about 8% by weight.

10. A process for producing a mineral enriched protein composition for use in the production of foodstuffs, comprising;

combining an aqueous slurry of a vegetable protein material and a hydrated gel of an alkaline earth metal phosphate salt, to form an alkaline earth metal fortified vegetable protein composition wherein the alkaline earth metal content of the alkaline earth metal fortified vegetable protein composition is from about 3–12% by weight, on a dry basis and wherein the alkaline earth metal fortified vegetable protein composition forms a stable suspension in said aqueous medium wherein the hydrated gel of the alkaline earth metal phosphate gel is prepared by forming an aqueous slurry of an alkaline earth metal hydroxide wherein the alkaline earth metal hydroxide forms at least 2% by weight of said slurry;

rapidly adding phosphoric acid to the slurry of the alkaline earth metal hydroxide; and vigorously mixing and either homogenizing at from 500–2000 pounds per square inch or sonicating at from 1000–1500 pounds per square inch the slurry of the alkaline earth metal hydroxide and the phosphoric acid to form the hydrated gel of the alkaline earth metal phosphate salt, wherein the hydrated gel of the alkaline earth metal phosphate salt has a solids content of at least about 3.0% up to about 14%, by weight and the hydrated gel of the alkaline earth metal phosphate salt is capable of forming a stable aqueous suspension in water.

11. The process, of claim 10 wherein the vegetable protein material is a soy protein material.

12. The composition of claim 11 wherein the soybean protein material comprises soy flour, soy concentrate or soy protein isolate.

13. The composition of claim 11 wherein the soybean protein material comprises soy protein isolate.

14. The process of claim 10 wherein the vegetable protein material is obtained at a pH of from about 6.5 to about 10.

15. The process of claim 10 wherein the alkaline earth metal comprises magnesium or calcium.

16. The process of claim 10 wherein the alkaline earth metal is calcium.

17. The process of claim 10 wherein the hydrated gel of the alkaline earth metal phosphate salt is tricalcium phosphate.

18. The process of claim 10 wherein the aqueous slurry of the alkaline earth metal hydroxide is not more than 9% by weight alkaline earth metal hydroxide.

19. The process of claim 10 wherein the aqueous slurry of the alkaline earth metal hydroxide is not more than 8% by weight alkaline earth metal hydroxide.

20. The process of claim 10 wherein the aqueous slurry of the alkaline earth metal hydroxide is not more than 7% by weight.

21. The process of claim 10 wherein the phosphoric acid is added to the slurry of the alkaline earth metal hydroxide in from 30 seconds up to 5 minutes.

22. The process of claim 10 wherein the hydrated gel of the alkaline earth metal phosphate salt has a solids content of not more than 11% by weight.

23. The process of claim 10 wherein the hydrated gel of the alkaline earth metal phosphate salt has a solids content of not more than 10% by weight.

* * * * *